Patented June 10, 1924.

1,497,179

UNITED STATES PATENT OFFICE.

CHOKICHI MATSUOKA, OF LOS ANGELES, CALIFORNIA.

CONCENTRATED FOOD COMPOSITION AND METHOD OF MAKING THE SAME.

No Drawing.  Application filed August 6, 1923. Serial No. 656,115.

*To all whom it may concern:*

Be it known that I, CHOKICHI MATSUOKA, a subject of the Emperor of Japan, residing at Los Angeles, in the county of Los Angeles and State of California, have invented and discovered a new Concentrated Food Composition and Methods of Making the Same, of which the following is a specification.

This invention and discovery more particularly relates to a food product made from fish and an object is to produce from fish a food product containing a large proportion of the nutritive constituents of the fish treated, but devoid of any pronounced fish flavor.

An object of this invention and discovery is to increase the store of palatable and nutritious food and to cheaply provide a highly nutritious and palatable food substance that will retain its desirable character for an indefinite time without deterioration and which is adapted to ready use in soups and other food preparations.

In carrying out this new invention and discovery, I eliminate from fish soup, the unpleasant odors and the substances likely to cause deterioration, by skimming and by a charcoal treatment which I will hereinafter more particularly describe.

Other objects, advantages and features of invention may appear from the subjoined detail description and the appended claims.

I will now describe the method of producing a food composition in accordance with my discovery.

The composition is prepared from fish which are first prepared for a thorough cooking in water; the small fish, such as sardines, being simply washed to free them from salt water and impurities, and the larger fish being properly cleaned as usual for cooking.

The fish when properly prepared are thoroughly cooked in any convenient quantities of boiling water; that is to say, at a temperature of about 212 degrees Fahrenheit for a suitable length of time, say from 3 to 10 hours, according to the size of the fish. By cooking the fish under pressure at a higher temperature, a shorter period of time may serve.

The fish is thus cooked with a sufficient quantity of water to completely dissolve the nutritive and nitrogenous substances of the fish, thus producing from oil containing food material a nutritive nitrogenous liquid or soup which is then separated from the solids by straining the liquid through a filter and by pressing the residue until the liquid is all expressed. The solid residue may be set aside for fertilizer or any other use to which it may be adapted.

The hot liquid is allowed to stand until the fish oil rises to the surface, and approximately all of such oil is then skimmed off; thus leaving a liquid soup practically free from oil and avoiding likelihood of the product becoming rancid.

Then the soup is cooked again at a temperature of about 190 degrees up to the boiling point of 212 degrees Fahrenheit.

To this product add powdered charcoal in the proportions of about one and one-half pounds or more to one hundred pounds of the soup. Boil the mixture from about five to ten minutes or more and then add about one pound of powdered or finely ground shells of any kind; then free the liquid from the solids. This may be done by passing the liquid through a filter which separates the charcoal and powdered shells from the liquid. When passing the liquid through a filter the powdered shells will accumulate upon the upper surface of the filtering medium and serve as an additional filtering medium. Then partially evaporate the liquid contents of the soup thereby obtaining the product which is a greyish white substance in a more or less thickened liquid form which may be then used as a food or which may be subjected to further evaporation to form a pulverizable mass that may be powdered.

The substance is preferably dispensed in the form of a powder which may be added to soups or gravies or other foods for flavoring purposes or may be eaten alone or as a dressing for bread or other foods.

The chemical analysis of the substance is about as follows:

|  | Per cent. | Per cent. | B. T. U. per lb. |
|---|---|---|---|
| Nitrogen | 7.8 |  |  |
| Protein |  | 51 | 528 |
| Water |  | 9 |  |
| Fat |  | 1 | 23 |
| Fiber |  | 0 |  |
| Nitrogen free extract |  | 17 | 718 |
| Ash |  | 22 |  |
|  |  | 100 | 1,269 |

After the final filtering a quantity of agar agar may be added to the liquid and thoroughly incorporated therein before the final evaporation and the product obtained by evaporating the mixture may be powered or may be stored without powdering, and may be dissolved in water or used in any way common with concentrated agar agar products.

If the addition of charcoal and finely ground shells to the cooked clear liquid is eliminated the product will be substantially dark amber color, and the product may be used in a more or less thickened liquid form as a flavoring for soups, gravies and the like.

The addition of charcoal takes off the fish odor and makes a whiter finished product. The powdered shells makes filtering easier by its tendency to prevent the filter from clogging and serving as an additional filtering medium.

I claim:

1. The food product set forth being a greyish white fish product practically free from fishy odor, pleasant to the taste and having an analysis substantially as follows, to-wit:

|  | Per cent. | Per cent. | B. T. U. per lb. |
|---|---|---|---|
| Nitrogen | 7.8 |  |  |
| Protein |  | 51 | 528 |
| Water |  | 9 |  |
| Fat |  | 1 | 23 |
| Fiber |  | 0 |  |
| Nitrogen free extract |  | 17 | 718 |
| Ash |  | 22 |  |
|  |  | 100 | 1,269 |

2. The method set forth of producing a food composition which comprises obtaining a nutritive nitrogenous liquid extract from oil containing food material; removing the solids from such extract; removing approximately all of the oil from such extract; then boiling the liquid and partially evaporating the liquid.

3. The method of making a condensed food set forth which comprises cooking fish in water and thereby dissolving the nutritious portions of the same; separating the liquid from the solids; allowing the hot liquid to stand until the oils rise to the top; skimming off the oils, thus leaving a liquid soup free from oils, then cooking the liquid at a temperature of from about 190 degrees Fahrenheit up to 212 degrees Fahrenheit; adding powdered charcoal in the proportions of about 1½ pounds of charcoal to 100 pounds of the liquid; boiling the mixture from about five to ten minutes or more; freeing the liquid from the solids; and then evaporating the liquid and thereby producing a nutritious substance.

4. The method set forth of producing a food composition which comprises cooking fish in boiling water for 3 to 10 hours to obtain a nutritive nitrogenous liquid extract containing the nutritive and nitrogenous substances of the fish; removing the solids from such extract; removing approximately all of the oil from such extract; then boiling the liquid to form a product having a more or less thickened liquid form substantially of dark amber color.

5. The method set forth of producing a food composition which comprises obtaining a nutritive nitrogenous liquid extract from oil containing food material; removing the oil from such extract; then adding charcoal to the product; then boiling the mixture; then freeing the liquid from the solids; and then evaporating the liquid.

6. The method set forth of producing a food composition which comprises obtaining a nutritive introgenous liquid extract from oil containing food material; removing the oil from such extract; then adding charcoal to the product; then boiling the mixture; then adding finely ground shells to the mixture; then freeing the liquid from the solids; and then evaporating the liquid.

7. The method set forth of producing a food composition which comprises obtaining a nutritive nitrogenous liquid extract from oil containing food material; removing the oil from such extract; then adding charcoal to the product; then boiling the mixture; then adding finely ground shells to the mixture; then freeing the liquid from the solids; then adding agar to such product; and then evaporating the liquid to form a pulverizable mass.

8. The method set forth of producing a food composition which comprises cooking fish to obtain a liquid extract containing the nutritive substances of the fish; separating the liquid from the solids; removing the oil from such extract; then cooking the liquid; adding charcoal to the product; boiling the mixture; then adding finely ground shells to the mixture; freeing the liquid from the solids; and then evaporating the liquid.

9. The method set forth of producing a food composition which comprises cooking fish to obtain a liquid extract containing the nutritive substances of the fish; separating the liquid from the solids; removing the oil from such extract; then cooking the liquid; adding charcoal to the product; boiling the mixture; then adding finely ground shells to the mixture; freeing the liquid from the solids; then adding agar to such product; and then evaporating the liquid to form a pulverizable mass.

In testimony whereof, I have hereunto set my hand at Los Angeles, California, this 31st day of July, 1923.

CHOKICHI MATSUOKA.

Witness:
JAMES R. TOWNSEND.